R. W. BRYAN.
ANTIRATTLING GEAR.
APPLICATION FILED MAY 26, 1919.
1,334,517. Patented Mar. 23, 1920.
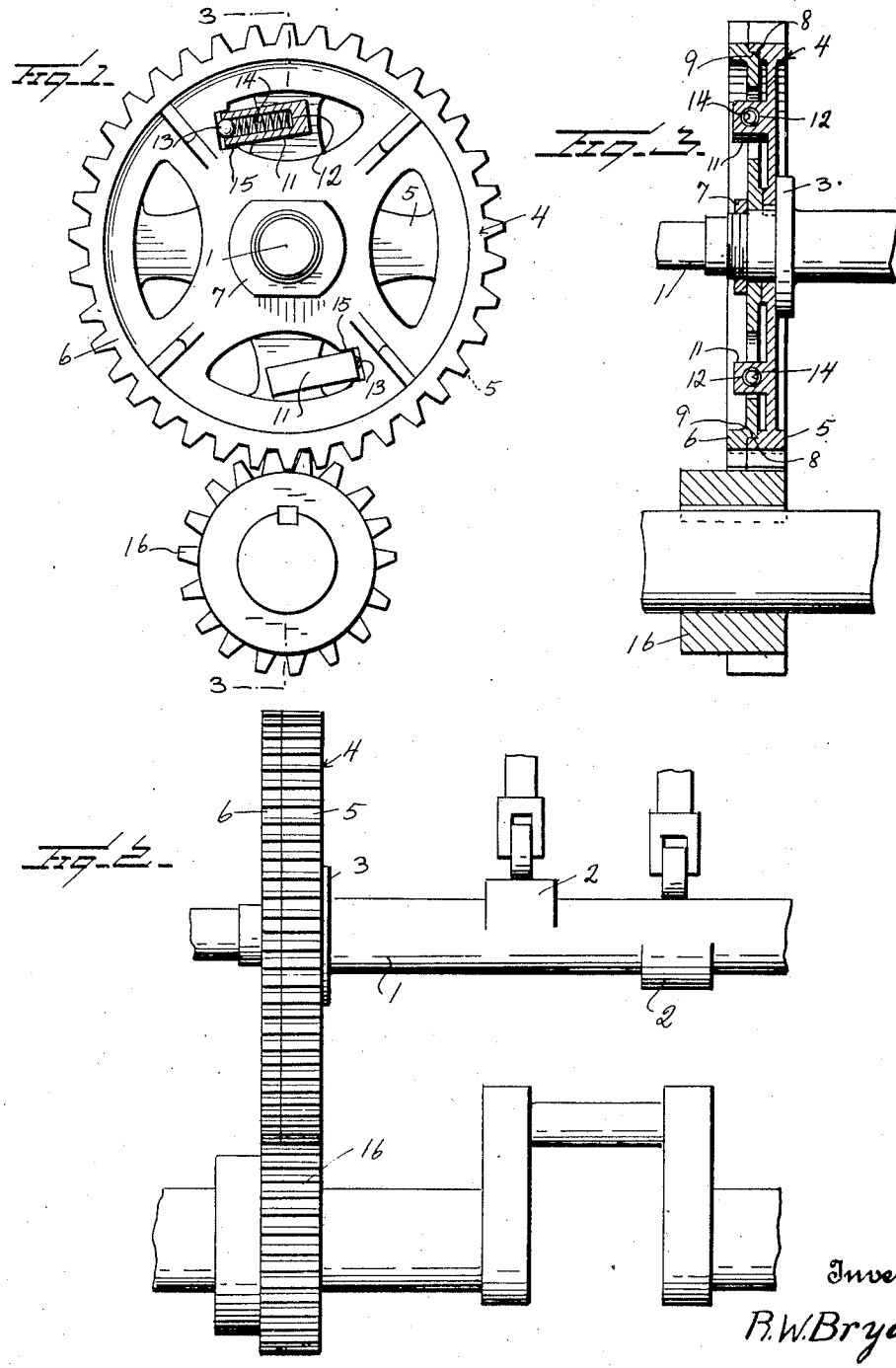

UNITED STATES PATENT OFFICE.

ROBERT W. BRYAN, OF ABERDEEN, WASHINGTON.

ANTIRATTLING GEAR.

1,334,517. Specification of Letters Patent. Patented Mar. 23, 1920.

Application filed May 26, 1919. Serial No. 299,786.

*To all whom it may concern:*

Be it known that I, ROBERT W. BRYAN, a citizen of the United States, residing at Aberdeen, in the county of Grays Harbor and State of Washington, have invented certain new and useful Improvements in Antirattling Gears, of which the following is a specification, reference being had to the accompanying drawings.

This invention relates to an anti-rattling gear, of the split type, and it is the aim not to limit the device to the particular construction herein shown and described, for it is obvious, equivalent constructions within the scope of what is claimed may be employed.

In the application of meshing gears, particularly in automobile and other gasolene engines, the springs of the valves of the engine have a tendency to drive the driven gear ahead, that is after the valve stem passes the apex of the cam on the valve operating shaft, thereby causing a rattling or clicking sound between the driving and driven gears, especially those as used on automobile engines. The present anti-rattling gear is designed to operate anti-clockwise.

Therefore, the object of the present invention is to eliminate the rattling or clicking sound between the teeth of the driving and driven gears, by overcoming the tendency of the springs driving the driven gear ahead, that is after the contacting part of the valve passes the apex of the cam on the valve operating shaft.

This anti-rattling gear may be employed in connection with other machinery where gears are employed, equally as well as in connection with automobile or other gasolene engines.

The invention further aims to provide a split gear, that is split in a plane parallel with the sides of the gear, in fact affording a pair of gears, preferably flatwise adjacent each other, but not necessarily, for they may be arranged otherwise, in combination with spring connections between the two gears or the parts of the split gear, in order to take up the play between the teeth of a driving gear and the driven gear.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a view in side elevation of the improved anti-rattling gear, constructed in accordance with the invention, showing a driving gear in mesh therewith, and showing the casing for the resilient means in section, in order to disclose the mounting of the resilient means, whereby it may contact with certain of the spokes of one of the sections or parts of the driven split gear.

Fig. 2 is a view in edge elevation of the anti-rattling split gear, showing the driving gear meshing therewith.

Fig. 3 is a sectional view on line 3—3 of Fig. 1.

Referring more especially to the drawings, 1 designates a conventional form of cam shaft, for operating the valves of an automobile or other gasolene engine, and formed with this shaft are the usual cams 2 for actuating the valve. Formed on one end of the shaft is a fixed collar 3. Mounted on the end portion of the shaft adjacent the outer face of the collar is a driven gear 4. This gear 4 is split, thereby constructing a pair of gear sections 5 and 6. The section 5 is fixed on the shaft adjacent the collar, while the section 6 is revolubly movable relatively to the fixed section. However, the revolubly movable section is held flatwise against the fixed section by means of the collar 7, which is threaded upon the shaft. The adjacent faces of the fixed and revolubly movable sections have interengaging parts 8 and 9, in order to insure concentricity between the sections as they are revolving with the shaft. Constructed on the spokes or any other suitable location of the fixed section are casings 11 having bores 12, and arranged in the bores are anti-frictional spherical members 13, between which and the closed ends of the bores coil springs 14 are interposed. These coil springs urge the spherical anti-frictional members in contact with bearings of the spokes, or any other suitable part of the section which is movable relatively to the fixed section. Preferably, though not necessarily, the spokes of the section which is movable relatively to the fixed section are provided with guide notches 15, to be engaged by the casings of the fixed section. The resilient coil springs have sufficient tension, to move the section which is movable relatively to the fixed section, so that the teeth or cogs of the movable section are out of alinement with the teeth of the fixed section. By accomplishing this result, it is to be seen that when the teeth of the driving gear 16 intermesh with the driven gear, and the shafts of the driving and driven gears are in fixed positions, the teeth of the driving gear will cause the teeth of the movable section to aline with the teeth of the fixed section against the action of the coil springs. Obviously the coil springs will act to urge the movable section, in order that its teeth will at all times tend to become out of alinement with the teeth of the fixed section, and this tendency of the teeth of one section become out of registration with the teeth of the other section, will take up the play between the teeth of the driving and driven gears, thereby avoiding the rattling or clicking sound between the teeth, as the gears are revolving.

The invention having been set forth, what is claimed as new and useful is:

1. The combination with a driving gear and a driven gear, of a shaft on which the driven gear is mounted, said driven gear comprising a pair of gear sections, flatwise adjacent each other, one section being fixed to the shaft, the other section being relatively movable to the fixed section, certain of the spokes of the fixed section having diametrically opposite housings provided with bores, the open ends of which face in opposite directions, certain of the spokes of the relatively movable gear section having notches, in which the open ends of the housings are guided, spherical members mounted in the bores and protruding beyond the open ends of the bores, to contact with the bottoms of the guides, resilient coil springs on the bores interposed between the spherical members and the closed ends of the bores, to resiliently urge the spherical members in contact with the bottoms of the notches, thereby tending to position the relatively movable gear section so that its teeth tend to become out of alinement with the teeth of the fixed section, thereby taking up the play between the teeth of the driven gear and the driving gear.

2. In a gearing, the combination with driving and driven gears, of a shaft on which the driven gear is mounted, said driven gear comprising a pair of gear sections flatwise concentric and adjacent each other, one gear section being fixed to the shaft, the other being loose on the shaft and having a portion fitting within the marginal rim of the fixed gear section, the loose gear section having a web provided with openings causing parts of the web to constitute spokes, diametrically opposite housings carried by the spokes of the fixed gear section and provided with sliding guide connections with the spokes of the loose gear section, said housings including yieldable means bearing upon and coöperating with the spokes of the loose gear section, whereby the movable gear section tends to move so that its teeth will position out of alinement with the teeth of the fixed gear section, thereby taking up the play between the teeth of the driving and driven gears.

In testimony whereof I hereunto affix my signature in the presence of two witnesses.

ROBERT W. BRYAN.

Witnesses:
 JAMES F. FULLER,
 J. MOAN COPELAND.